Sept. 12, 1933. R. B. FAGEOL 1,926,273
TRACTION REGULATING MEANS FOR MULTIWHEEL ROAD VEHICLES
Filed Dec. 7, 1929 2 Sheets-Sheet 1
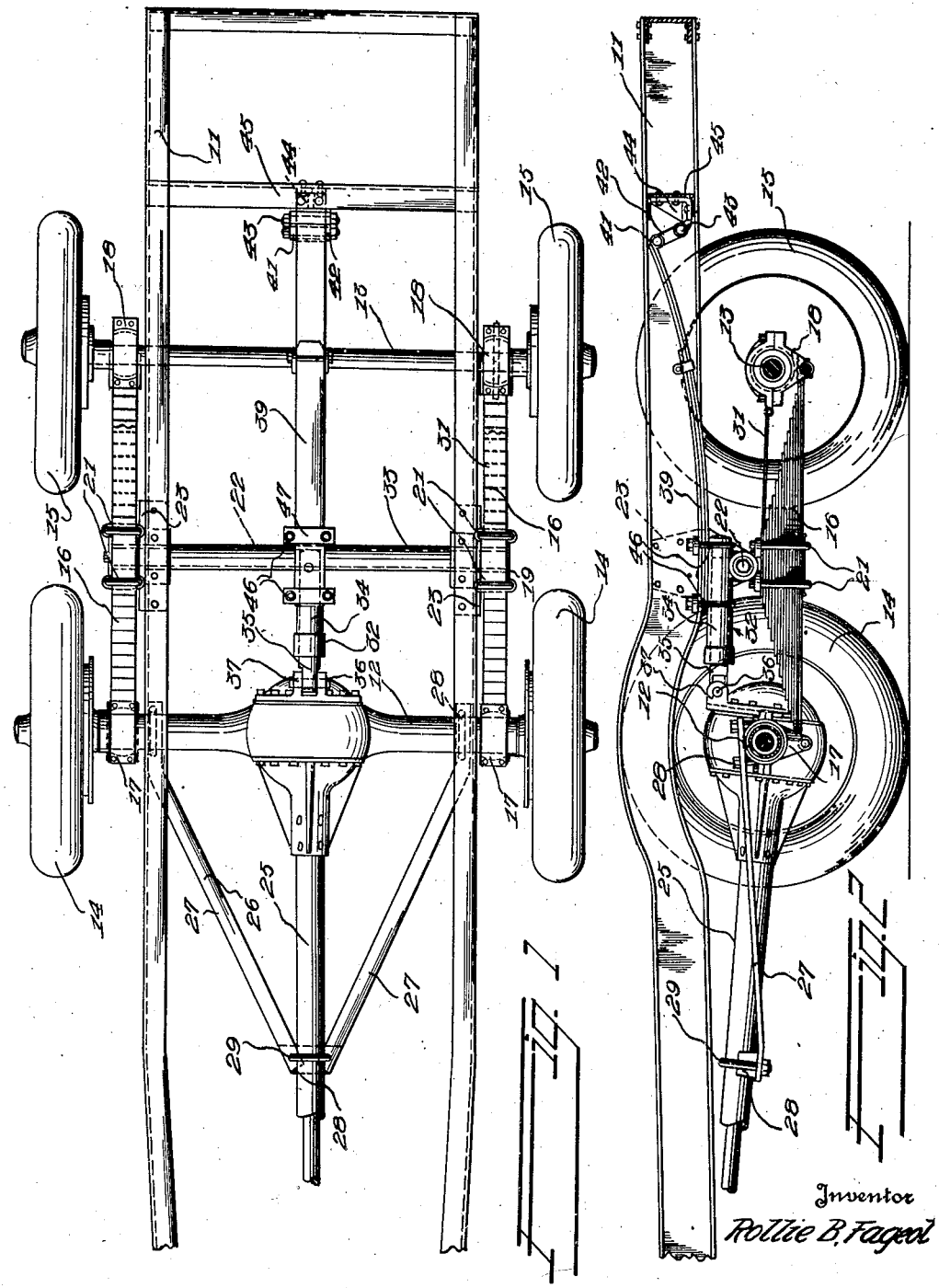
Inventor
Rollie B. Fageol
By Strauch & Hoffman
Attorneys Sept. 12, 1933. R. B. FAGEOL 1,926,273
TRACTION REGULATING MEANS FOR MULTIWHEEL ROAD VEHICLES
Filed Dec. 7, 1929 2 Sheets-Sheet 2
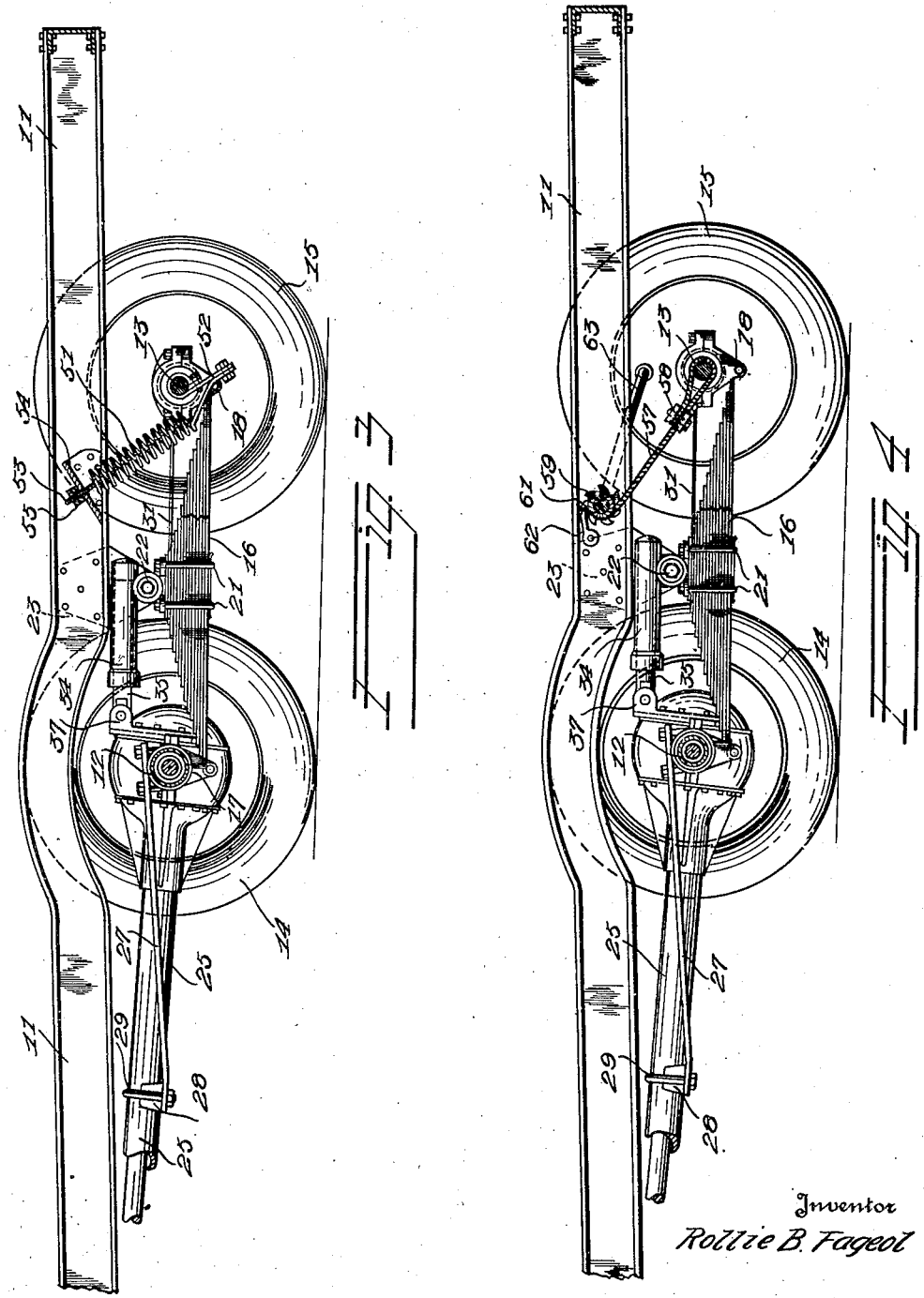
Inventor
Rollie B. Fageol Patented Sept. 12, 1933

UNITED STATES PATENT OFFICE 1,926,273

TRACTION REGULATING MEANS FOR MULTIWHEEL ROAD VEHICLES

Rollie B. Fageol, Los Angeles, Calif., assignor, by mesne assignments, to Automotive Engineering Corporation, a corporation of Delaware Application December 7, 1929. Serial No. 412,510

12 Claims. (Cl. 180—22)

The present invention relates to traction regulating arrangements for multi-wheel road vehicles.

More specifically, the invention relates to means for operative association with multi-wheel road vehicles having only a single drive axle for providing effective traction by the drive wheels when the vehicle is in the unloaded condition.

Heavy duty requirements of automotive road vehicles have brought about the construction of multi-wheel vehicles, or vehicles provided with a pair of axles and associated wheels for supporting the rear portion or body of the vehicle.

Multi-wheel vehicles as now constructed are of two general types, one in which both axles are drive axles, and the other in which only one axle is driven.

The former type of multi-wheel vehicle is comparatively expensive of construction and is not readily constructed from standard four wheel vehicles by the simple addition of parts.

The latter type of multi-wheel vehicle, while having equal load carrying capacity to the former or dual drive type, does not provide sometimes, in unloaded condition, sufficient traction for the drive wheels of the single drive axle, particularly when operating on soft or wet roadways.

It is a primary object of the present invention to provide traction regulating means for single drive multi-wheel road vehicles for providing effective traction on the drive wheels when the vehicle is unloaded, thus adapting single drive multi-wheel vehicle to substantially the same service conditions for which the dual drive multi-wheel vehicles are well adapted.

A further object of the invention is to provide traction regulating means for a single drive multi-wheel vehicle comprising yieldable means associated with the vehicle frame and one of the axles in such manner that the drive wheels in unloaded condition of the vehicle will be held in frictional contact with the roadway under sufficient pressure for providing effective traction for propulsion of the vehicle over wet or soft roadways.

A still further object of the present invention is to provide means for operative association with the frame and one of the axles of a single drive multi-wheel road vehicle for urging the drive wheels into frictional contact with the roadway under pre-load conditions of the vehicle for providing effective traction for propulsion of the vehicle over wet or soft roadways, said means being connected with said frame and said axle in a manner not to substantially restrict the flexibility of the multi-wheel construction.

A further object of the invention is to provide an arrangement for imposing a greater proportion of the dead weight of the vehicle body on the single drive axle of a multi-wheel road vehicle, when the vehicle is unloaded, and to automatically reduce the proportion of weight of the body on the drive axle when the body is loaded and said axle supports sufficient load to insure sufficient traction between the drive wheels and the roadway under the most severe conditions of service.

Further objects of the invention will appear as a description thereof proceeds with reference to the accompanying drawings in which, Figure 1 is a top plan view of the rear portion of the chassis of a multi-wheel vehicle disclosing one embodiment of my invention.

Figure 2 is a vertical longitudinal sectional view of the construction disclosed in Figure 1, the section being taken immediately inwardly of the rear wheels and with the adjacent side member of the vehicle frame broken away.

Figures 3 and 4 are views, similar to Figure 2, respectively disclosing modified embodiments of my invention, the views being broken for more clearly disclosing the traction regulating means in association with the dead axle between the spring universal hangers carried thereby.

Referring to the drawings by reference characters in which like characters designate like parts, and referring first to Figures 1 and 2 in which is disclosed the rear portion of a multi-wheel vehicle of the character disclosed in my application filed on even date herewith and which, as disclosed in said application, is preferably constructed from a standard four wheel vehicle. The present invention however is not limited to the specific multi-wheel vehicle construction disclosed in said application but is applicable to all multi-wheel vehicle constructions embodying a driven and a dead axle yieldably connected with the vehicle frame through spring assemblies that distribute the load on the several axles.

The vehicle construction illustrated in Figures 1 and 2, disclosing one of the adaptations of my invention, is preferably constructed from a standard Chevrolet four wheel vehicle, and comprises a frame 11 which as disclosed in said copending application may comprise the standard vehicle frame, and an extension frame secured thereto for providing the required length of frame commensurate with the increased wheel base provided by the addition of the dead axle. The rear portion of frame 11 is supported by a drive axle 12, which, in the present embodiment, is the standard drive axle, and a dead axle 13 which axles are respectively provided with drive wheels 14 and non-driven wheels 15. Said axles are yieldably connected with frame 12 by spring assemblies 16, which are, preferably, connected with axles 12 and 13 as well as with frame 11 in the manner disclosed in detail in my said copending application, and comprising ball hangers 17 associated with drive axle 12 and ball hangers 18 associated with dead axle 13. To said ball hangers the opposite ends of spring 16 are pivotally secured in suspended or underslung relation to axles 12 and 13. The springs 16 intermediate their ends are secured to saddles 19 by U-bolts 21, and the saddles 19 are pivotally secured on the opposite ends of a transverse trunnion shaft 22 which adjacent the opposite ends thereof is supported by brackets 23 secured to frame 11, thus providing a dual axle truck construction pivotally connected with the vehicle frame intermediate the axles for free vertical movement of the opposite axles in response to road irregularities encountered by the wheels thereof. The trunnion shaft 22 is preferably disposed in such relation to axles 12 and 13 that the greater portion of the load is supported by the drive wheels 14 for providing effective traction.

The standard drive axle 12 has associated therewith and rigidly secured thereto one end of an extensible drive shaft tube or housing 25, which is preferably connected with axle 12 by a stay rod construction 26 of the character disclosed in said application for bracing tube 25 against lateral movement with respect to axle 12. The stay rod construction 26 embodies rearwardly diverging arms 27 the rear laterally spaced ends of which are secured to axle 12 adjacent the opposite ends thereof by U-bolts 28, and the adjacent ends of arms 27 or the apex of the stay rod construction 26 is rigidly secured to tube 25 by a tube engaging block 28 and a U-bolt 29.

The drive axle 12 being connected with springs 16 by depending ball hangers 17 means are preferably provided for positioning axle 12 longitudinally of frame 11 which may comprise a standard drag link connection between tube 25 and the vehicle frame in the manner disclosed in said application or any other known manner.

The ball hangers 18 are preferably of the construction disclosed in said application for the pivotal connection therewith of the adjacent ends of springs 16, as well as the adjacent ends of positioning spring leaves 31 whose opposite ends are integral with or connected to springs 16 for holding axle 13 in alinement with axle 12 in the manner disclosed in said application.

The drive axle 12 is restrained against lateral movement relative to frame 11 by a drag neutralizer 32 which not only serves the noted function but provides an element of the novel traction regulating combination forming the subject matter of the present invention.

The drag neutralizer 32 comprises a tubular member 33 rotatably mounted on trunnion shaft 22, and disposed against longitudinal movement on the shaft 22 in any suitable manner. Secured to tube 33 in any desired manner, as by welding, and intersecting same at right angles thereto is a relatively short tubular member 34 with the forward end thereof disposed between axle 12 and shaft 22. Reciprocably mounted in tube 34 is the body portion of a plunger 35 whose forward end is pivotally connected at 36 between ears 37 rigidly supported by axle 12.

The drag neutralizer 32 permits all movements of axle 12 afforded by its connections with springs 16 with the exception of bodily movement of axle 12 transversely of frame 11 in the manner disclosed in the application above referred to.

As before stated, trunnion shaft 22 is located between axles 12 and 13 so that the greater portion of the load is supported by the drive wheels 14, the disposition of shaft 22 relative to axles 12 and 13 being preferably such that 60 percent of the load is supported by wheels 14 and 40 percent of the load supported by wheels 15.

This unequal distribution of the load is so proportioned that a sufficient part of the load is supported by axle 13, as not to seriously overload axle 12 and wheels 14 supporting same, while a sufficiently large portion of the load is supported by axle 12 to provide satisfactory traction for the drive wheels 14 when the vehicle is loaded.

This unequal distribution of the load provides sufficient traction under loaded condition of the vehicle, but under preload or unloaded condition of the vehicle slippage of the drive wheels 14 may occur particularly on soft or wet roadways because of the relatively small weight resting thereon.

In order to provide sufficient traction by the drive wheels 14, when the vehicle is not loaded, means reacting against the frame are provided for urging the drive wheels 14 into frictional contact with the roadway for providing increased traction, and thus preventing slipping or spinning of the drive wheels on soft or wet roadways.

Such means in a preferred embodiment thereof comprises a single auxiliary preload traction spring 39 of the leaf type, the small end of which is pivotally connected at 41 to the outer ends of shackle links 42, whose inner ends are pivotally connected at 43 to a block 44 rigidly connected to a transverse frame member 45 preferably substantially midway of the opposite sides of frame 11 as indicated in Figure 1. The forward or thicker end of spring 39 is rigidly secured by a pair of U-bolts 46, and cooperating washer plates 47, to tube 34.

The spring 39, as more clearly indicated in Figure 2, is connected with tube 34 such that the center of the rigid connection with tube 34 is disposed slightly forwardly of trunnion shaft 22 and the spring 39 in the connection thereof with tube 34 is placed under such strain as to urge tube 34 counter clockwise about its pivotal connection on tube 22, so that under preload condition the drive wheels 14 are forced into contact with the roadway under a preload pressure of for example from three hundred to four hundred pounds, thus providing sufficient frictional contact with the roadway as to provide effective traction on soft or wet roadways.

When the vehicle is loaded the trunnion shaft 22 moves downwardly with respect to pin 37 relieving much as for example approximately 50 percent, of the strain in spring 39, by thus varying the curvature of said spring. As a result wheels 14 are urged into frictional contact with the roadway under less spring pressure than in unloaded condition. However under loaded condition of the vehicle sufficient traction is obtained by the drive wheels 14 under all operating conditions because of the increased load on said wheels.

Thus it will be seen that a novel automatic traction regulating means is provided, whereby a multi-wheel vehicle construction embodying a drive axle and a dead axle may be utilized with practically the same traction as is obtained with a vehicle having four driven wheels. And such traction is secured when the vehicle is unloaded. The necessity of a four wheel drive is avoided thereby considerably reducing the expense of manufacturing of vehicles of this character.

It is to be particularly noted that spring 39 will not be materially deflected upon simultaneous vertical movement of both axles 12 and 13 in which instance the main load supporting springs 16 will be deflected and bear the load but when axle 12 rises vertically in advance of axle 13 spring 39 will immediately come into action to yieldably resist such movement of axle 12, and thus maintain the drive wheels 14 in firm tractive engagement with the roadway.

While I have disclosed the novel traction regulating means for multi-wheel road vehicles in operative association with a specific vehicle construction, the invention is not limited thereto as the traction regulating means disclosed are equally applicable to various other single drive multi-wheel vehicle constructions whether constructed from standard four wheel vehicles or as new multi-wheel constructions.

In Figure 3 is displosed a modified embodiment of the invention wherein the traction regulating means is such that instead of the drive axle 12 being yieldably forced into road contact as in the previous embodiment of the invention the dead axle 13 is yieldably urged upwardly under unloaded conditions resulting in increased load on the drive-wheels 14 thus providing effective traction between the drive wheels and the roadway.

The construction in accordance with this embodiment of the invention comprises a relatively heavy coil spring 51 which is disposed substantially midway of the width of frame 11 with the inner end thereof secured to axle 13 by means of a bracket or clamp 52. The spring 51 is preferably disposed substantially in the vertical plane of tube 34 of the centrally disposed drag neutralizer 32, and in order to provide sufficient length of spring the spring is preferably disposed in angular relation to the horizontal plane of the axes of axles 12 and 13 with the outer end thereof comprising a threaded axial extension 53 which projects through a hole in an angular transverse member 54 of frame 11. The threaded extension 53 is engaged by a nut 55, whereby upon turning of same in one direction or the other more or less tension can be placed in spring 51 for urging axle 13 out of road contact with greater or less force.

In accordance with this embodiment of the invention spring 51 is put under sufficient tension to urge axle 13 upwardly, which through the pivotal connection 22 will urge axle 12 downwardly for providing sufficient traction between the drive wheels and the roadway under preload conditions when otherwise sufficient traction between the drive wheel 14 and the roadway might not be secured. The tension in spring 51 can readily be adjusted upon turning of nut 55 for effecting any desired preload traction by drive wheels 14.

Under loaded condition of the vehicle the frame 11 moves downwardly shortening the spring and resulting in substantially less tension therein, and proportionately less downward urgency on drive wheels 14 through the spring because when loaded the traction is sufficient under all operating conditions.

The spring 51 connected to frame 11 and axle 13 as disclosed further functions to hold axle 13 substantially in temporary operative position in the event of breaking of a supporting spring 16.

In Figure 4 is disclosed a still further embodiment of the invention which comprises a cable 57, one end of which is looped around axle 13 and secured to the body portion of the cable by a clamp 58. The cable 57 is wound around a drum or shaft 59 with the opposite end of the cable secured thereto. The shaft 59 extends transversely of frame 11 and is rotatably journaled therein. The shaft 59 adjacent one of the side members of frame 11 has secured thereto a ratchet wheel 61 with which co-operates a pawl 62 pivotally secured to frame 11 for preventing counter clockwise movement of shaft 59 or unwinding of cable 57 therefrom. Secured to shaft 59 outwardly of frame 11 is an operating handle 63 whereby shaft 59 may be manually rotated for winding cable 57 thereon and thus elevating axle 13 for placing more or less of the load on the drive wheels 14.

This construction provides a manually adjustable preload traction for the drive wheels 14, which will be less effective under loaded conditions when the tension of cable 57 will be reduced upon lowering of frame 11 when the load is sufficient on drive wheels 14 so that the traction is good under all operating conditions. By disposing the cable 57 midway of the opposite sides of frame 11 and connecting same with axle 13 centrally thereat the transverse flexibility of the axle 13 is in no way restricted.

It will be seen from the foregoing disclosure that novel traction regulating means are provided for single drive multi-wheel vehicles which afford sufficient traction by the drive wheels thus eliminating the necessity of the more expensive dual drive multi-wheel road vehicles.

While I have disclosed my novel traction regulating means in operative association with specific multi-wheel vehicle constructions such are to be considered as illustrative only and not restrictive as the traction regulating means disclosed are equally applicable to various others single drive multi-wheel vehicle constructions and the scope of the invention is defined in the sub-joined claims rather than by the foregoing specific disclosure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. In combination with a multi-wheel vehicle including a driven and a dead axle provided with drive and non-drive wheels respectively, said axles being flexibly connected to the opposite ends of load supporting springs having a pivotal connection with the vehicle frame for providing for vertical oscillation of said axles, about said pivotal connections, of pre-load traction increasing means for said drive wheels, automatically responsive to and variable with changes in load, and operatively associated with said frame and one of said axles for normally and automatically urging said drive wheels into pressure engagement with the roadway for effective traction in unloaded condition of said vehicle; said means being associated with said frame and said axle in a manner not to restrict the necessary flexibility of the multi-wheel construction.

2. The combination defined in claim 1 in which said driven axle is restrained against transverse movement by means of telescoping members whose opposite ends are pivotally connected to said driven axle and said supporting spring pivotal connections; and in which said traction increasing means comprises a yieldable member connected with said telescoping members in such manner as to be placed under strain by pivotal movement of said telescoping members in unloaded condition of the vehicle for urging said drive wheels into tractive engagement with the roadway.

3. The combination defined in claim 1 in which said traction increasing means comprises a rigid member pivotally mounted for vertical swinging movement about said supporting spring pivotal connections and having a combined universal and longitudinal sliding connection with said driven axle; and a yieldable member having one end thereof rigidly connected with said rigid member for yieldably urging same about its pivotal connection for providing pre-load traction for said drive wheels.

4. The combination defined in claim 1 in which said automatic traction increasing means is adjustable for effecting any desired preload pressure on said drive wheels.

5. The combination defined in claim 1 in which said traction increasing means comprises a helical spring having one end thereof connected to said dead axle and the other end thereof adjustably secured to said frame.

6. In combination in a multi-wheel vehicle, a drive axle and a dead axle respectively provided with driven and non-driven wheels; said axles being flexibly connected with the opposite ends of supporting springs; said springs being pivotally connected with the frame of said vehicle for vertical oscillation of said axles about said pivotal connections, and means associated with said frame and one of said axles adjacent the transverse center of said vehicle for urging said drive wheels into pressure engagement with the roadway for providing increased traction by said drive wheels, said means comprising a tubular member pivotally mounted on said supporting spring pivotal connections, a member pivotally connected to said drive axle and telescopingly connected with said tubular member; and a leaf spring having one end thereof flexibly connected with said frame and the opposite end thereof rigidly connected with said tubular member for urging said tubular member about its pivot and providing additional pressure on said drive axle for effective pre-load traction by said drive wheels.

7. A multi-wheel vehicle comprising a frame; a drive and a non-driven axle supporting one end of said frame; springs interconnecting said axles and frame in a manner to distribute the load on said axles; resilient means interconnecting said frame and one of said axles to shift an abnormal part of the load of the unloaded vehicle to the drive axle, said means being arranged so that when the frame approaches the axles under loaded condition of the vehicle the effect of said means is automatically reduced.

8. A multi-wheel road vehicle comprising a frame, a drive and a non-driven axle supporting one end of said frame, springs interconnecting said frame and axles so that the weight is distributed on said axles; resilient auxiliary means to shift a portion of the weight of the unloaded vehicle from the non-driven to the drive axle; said means being disposed substantially centrally transversely of the vehicle whereby the ends of the axles are free to rise or fall when the wheels that support said ends move over road irregularities.

9. The combination defined in claim 8 in which said resilient means comprises a spring arranged to be increasingly effective when the axles and frame separate and decreasingly effective as the frame approaches the axles.

10. In a multi-wheel vehicle, a frame; a drive axle and a dead axle arranged in tandem at one end of said frame; a transverse shaft carried by the frame between the axles; a suspension system mounting said frame upon said axles to distribute respective portions of the load upon the latter, said suspension system comprising springs pivoted on the ends of said shaft and yieldable to permit the frame to approach the axles as the vehicle is loaded, a drag neutralizing device pivoted on an intermediate portion of said shaft, said device being connected to said drive axle to restrict endwise movement of the latter transversely of the frame; and means interconnecting said frame and said neutralizing device, to form with the latter a traction regulating mechanism, said regulating mechanism being operable to vary the proportion of the load supported by said drive axle.

11. In a multi-wheel road vehicle, a frame; two sets of wheels arranged in tandem at one end of said frame, one set being driven and the other idle; a suspension system for supporting said frame and its load upon said set of wheels, said suspension system being vertically yieldable to permit said frame to approach and recede from the wheel axes; and traction regulating means, connected to the frame and reacting to bear down on the driven wheels, automatically responsive to up and down movement of the frame relative to the wheel axes to increase and decrease respectively the downward reaction of said means upon the driven wheels.

12. In a multi-wheel road vehicle, a frame; two sets of wheels arranged in tandem at one end of said frame, one set being driven and the other idle; a suspension system for supporting said frame and its load upon said sets of wheels, said suspension system being vertically yieldable to permit said frame to approach and recede from the wheel axes upon variation in load; and resilient traction regulating means, connected between the frame and the idle wheels and automatically responsive to up and down movement of the frame relative to the wheel axes, to decrease and increase respectively the proportion of the load carried by said idle wheels and thus correspondingly vary the traction of the driven wheels.

ROLLIE B. FAGEOL.